April 13, 1926.
J. B. HENDERSON
1,580,298
DISTANT CONTROL OF TELESCOPES OR CAMERAS
Filed July 26, 1919
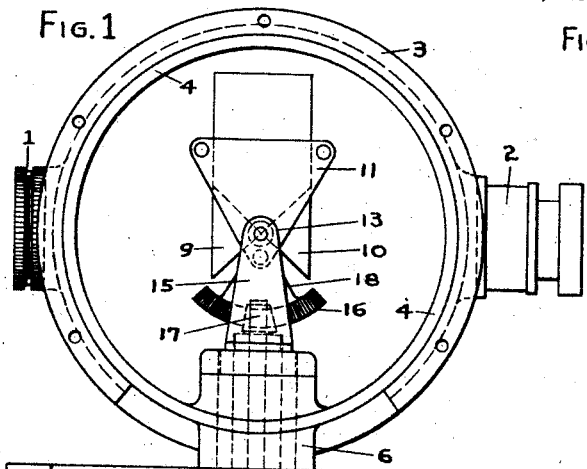
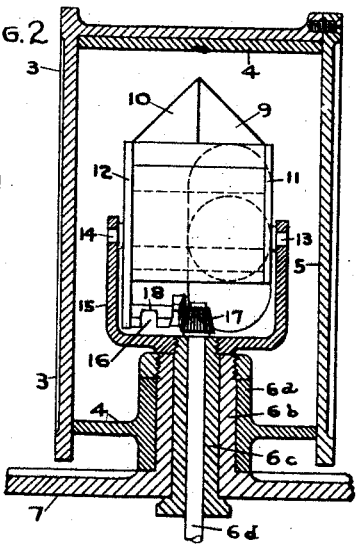
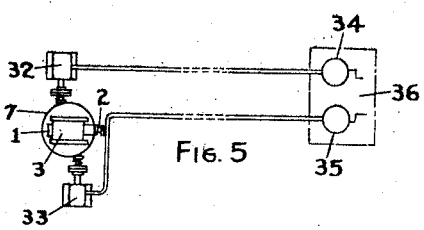
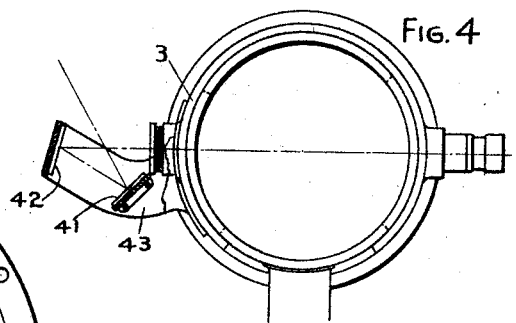
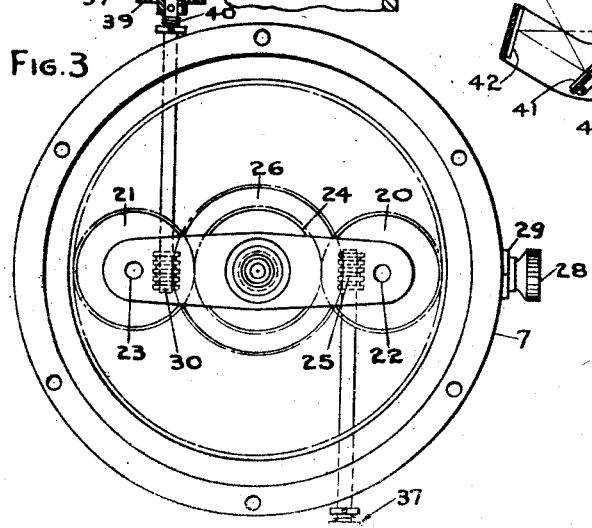
INVENTOR.
James B. Henderson
BY
ATTORNEYS.

Patented Apr. 13, 1926.

1,580,298

UNITED STATES PATENT OFFICE.

JAMES BLACKLOCK HENDERSON, OF LEE, ENGLAND.

DISTANT CONTROL OF TELESCOPES OR CAMERAS.

Application filed July 26, 1919. Serial No. 313,534.

(GRANTED UNDER THE PROVISIONS OF THE ACT OF MARCH 3, 1921, 41 STAT. L., 1313.)

*To all whom it may concern:*

Be it known that I, JAMES BLACKLOCK HENDERSON, a subject of the King of Great Britain, residing at No. 2 Cambridge Road, Lee, in the county of Kent, England, have invented certain new and useful Improvements in Distant Control of Telescopes or Cameras (for which I have filed an application in England, No. 4,559, March 28, 1916), of which the following is a specification.

The object of my invention is to provide an improved optical instrument such as a telescope or camera in which the field of view may be controlled from a distance. For example, in observing by means of a telescope the fall of shot during naval gunfire it is desirable that the field of view of the spotter should be controlled to follow the guns so as to be certain that the spotter is noting the fall of shot round or upon the proper target.

According to my invention I employ a telescope having an optical system of the type described in my previous British patent application No. 6,977 of 10th May 1915, and instead of controlling the stabilized internal part of the optical system by means of a gyroscope I control it from a distant point, for example from the director tower so that the field of view always contains at its centre the target on which the guns are laid.

In the accompanying drawings which illustrate my invention in one of its forms as applied to a telescope, Fig. 1 shows a side elevation of the telescope with the cover plate removed, the box containing the gears being shown in section.

Fig. 2 shows a central vertical cross section of the telescope.

Fig. 3 shows a plan of the gear box with the cover removed.

Fig. 4 is a side elevation partly in section of the telescope arranged for viewing aircraft.

Fig. 5 is a diagrammatic view, showing the control of the instrument from a distant station.

The instrument consists of a prismatic telescope of which the objective 1 and eyepiece 2 are carried by a cylindrical box 3 which fits outside the cylindrical ring 4. Holes are cut in the ring 4 to clear the objective 1 and eyepiece 2 and the side of the box 3 is cut away to leave the box free to be elevated or depressed say through 30°. The cover plate 5 serves to close the box 3 and to keep it in position on the ring 4. The box 3 and ring 4 may be turned in azimuth on the sleeve bearing 6 the outer sleeve 6ª of the bearing being cast on the ring 4 and the inner sleeve 6ᵇ being a projection on the top of the gear-box 7 which is carried by the pedestal 8.

Two concentric spindles 6ᶜ and 6ᵈ pass through the sleeve 6ᵇ of the gear-box, these spindles serving respectively to train and to tilt the prisms of the telescope. The prisms 9 and 10 are clamped together between the two plates 11 and 12 which carry the trunnions 13 and 14 on which the prisms are mounted in the fork 15 which is fixed to the spindle 6ᶜ. The bevel toothed sector 16 is fixed to the plate 12 by the bracket 18 and it gears with the bevel pinion 17 which is keyed on the end of the spindle 6ᵈ. It is evident that if the spindle 6ᶜ is rotated the prisms are caused to turn in azimuth and if 6ᵈ is rotated the prisms are caused to tilt on the trunnions 13, 14.

The spindle 6ᶜ is operable by receiver mechanism which will now be described. The spindle 6ᶜ carries at its lower end the two armed spider 19 which supports the two epicyclic pinions 20 and 21 on the spindles 22 and 23 respectively. The spider 19 is trained by the centre wheel 24 of the epicyclic gear which is turned by the worm 25 gearing with the worm wheel 26. The outer ring 27 of the epicyclic gear is toothed internally and gears with the pinions 20 and 21. It is normally fixed to the box 7 but it may be turned relatively to the box by means of the knob 28 which projects through a slot in the box and the position of the knob 28 is indicated by a pointer 29 and a scale on the flange of the gear box.

The spindle 6ᵈ is turned by receiver mechanism which includes the worm 30 and worm wheel 31. The two worms 25 and 30 may be turned by step by step electric motors 32 and 33 which also form part of the receiver mechanism and are controlled by transmitters 34 and 35 in the distant station 36. These motors and transmitters are shown diagrammatically in Fig. 5. In some applications one or other worm may be worked by hand instead of by motor, as shown in Fig. 3, where the shafts carrying worms 25 and 30 are each formed of two parts normally coupled by a clutch 37. The clutch member 38 on one of the sections of the shaft has pins adapted to fit into holes in the clutch member 39 on the other section of the shaft. The clutch member 39 has a sliding driving fit with its shaft, and may be pressed against a spring 40 to be disengaged from the clutch member 38. Thereafter, the periphery of the clutch member 39 may be grasped and turned to actuate its worm 25 or 30 independently of the control of the distant station. Where no distant control is wanted, the clutch member 39 may be replaced by a knob on the shaft.

The method of using the instrument is as follows:—The observer trains and elevates the telescope by hand by grasping the eyepiece and moves it about until he gets a field of view. When this field of view is most clearly defined the relative arrangement of the telescope parts is that shown in Fig. 1, and but for a motion of the eyepiece of say 10° up or down or on either side in azimuth, the field of view does not change. Beyond that displacement the field of view is cut off completely. So long as the observer sees anything he knows that the field of view is chosen for him by the step by step motor which is controlled from the distant station, and that no motion of the telescope tube can alter the field of view relatively to the cross wires.

For some purposes it is necessary that the observer should be able to alter the field of view relatively to the cross wires independently of the transmitting station. For example in a spotter's telescope worked from the director tower on board of a ship of war, it is necessary that the observer should be able to allow for the deflection which is set on the director telescope relatively to the tower, or again in long base range finders the transmitter may give the observer at one end of the base a line of sight parallel to that of a telescope at the other end of the base and he must then be able to bring his line of collimation on to the target and to measure the angle through which it has been turned in doing so. For either purpose the toothed ring 27 may be turned by means of the knob 28. In the one case the pointer 29 would be set to the required deflection and in the other case the pointer 29 would read off the angle subtended at the target by the base of the range finder.

Only one optical system is illustrated in the figure but I may employ any of the optical systems which I have described in my British Patents Nos. 6977 and 16669 of 1915.

For anti-aircraft range finding or other similar purpose in which the telescope has to be elevated to the zenith I may conveniently impart an initial elevation to the line of collimation of the telescope of say 60° by means of two reflectors 41 and 42 placed outside the objective and attached as in a bracket 43, to the box 3 which carries the objective so that the eyepiece need not be elevated or depressed more than say 30° from the horizontal.

To make a camera out of a telescope a sensitive plate may be placed in the focal plane or a camera may be attached rigidly to the eyepiece of the telescope in the well-known manner.

Having now particularly described and ascertained the nature of my said invention and in what manner the same is to be performed, I declare that what I claim is:—

1. In an optical instrument, a telescopic sight member, reflecting prisms, a support therefor, said member and support being mounted for independent movement about a common axis, and operating means subject to remote control operable to move said prism support about said axis independently of said member.

2. In an optical instrument, a telescopic sight member, reflecting prisms, a support therefor, said member and support being mounted for independent movement about a common axis to bring said sighting member and prisms into and out of reflection-conveying relationship, and operating means subject to remote control operable to relatively move said member and prism support.

3. In an optical instrument a telescopic sight member, reflecting prisms, a support therefor, said member and support being mounted for independent movement in altitude and azimuth about common axes, and operating means subject to remote control operable to actuate said support and prisms independently of said member.

4. In an optical instrument, an objective, reflecting prisms, separate supports for said objective and said prisms independently movable about a common axis, an actuating connection controlling said prism support and prisms operable from a distant station, and a local control at the instrument for said prisms operable independently of the distant control.

5. In an optical instrument, a sight member and a prism system mounted for independent movement about a common axis into a position of mutual alignment wherein a light beam passes through the instrument, and out of such position whereupon said prism system occults the light beam, and positioning means operable from a distant station to selectively position said prisms, said sight member being adjustable to the latter to establish a field of view selected by said distant station.

6. In an optical instrument, relatively movable telescope members each provided with optical parts adapted to coact with the optical parts of the other member, and actuating means controllable from a distant station to move one of said telescope members to establish the field of view of the instrument, the other member being optically adjustable thereto.

7. In an optical instrument, a sight member and a prism system mounted for independent movement about a common axis, actuating means controllable from a distant station operatively connected to said prism system and adapted to selectively position the same, said sight member being adjustable to said prism system, and manually operable means at the instrument for adjusting the prism system about said axis whereby the selected field of view is adjusted to the focal plane of the instrument.

8. An optical instrument comprising a frame, a member movably mounted on the frame and carrying some of the optical parts of the instrument, a second member mounted on the frame for movement about two mutually perpendicular axes and carrying other optical parts and means whereby said second member may be actuated from a distant station to permit the field of the instrument to be controlled from such station.

9. An optical instrument comprising a frame, a member movably mounted on the frame and carrying some of the optical parts of the instrument, a second member rotatably mounted on the frame, a third member rotatably mounted on the second member and carrying other optical parts, said members being rotatable about a common axis, and means for actuating from a distant station said second and third members whereby the field of the instrument may be controlled from such station.

10. In an optical instrument provided with an objective, an eye-piece and reflecting prisms, the combination of a swivelling support for said prisms, and a support-oscillating drive under the control of a distant station operable to move the prisms from a distant station about an axis perpendicular to the line of collimation of the objective and eye-piece.

11. In an optical instrument provided with an objective and an eye-piece, with reflecting prisms between them, the combination of a support for said prisms mounted to swivel in a plurality of directions, support-swivelling means selectively operable from a distant station to move the prisms in a chosen direction independently of the objective and eye-piece.

12. In an optical instrument the combination of an objective, a movable mounting therefor permitting it to be pointed directly at the object to be viewed, an eye-piece held for coaction with said objective, a prism system between the objective and the eye-piece, a mounting for said prism system movable about a pair of angularly disposed axes, and means for actuating the prism mounting from a distant station independently of the objective to control the field of view of the instrument.

13. In an optical instrument, the combination of a frame, an objective, an eye-piece, a member movably mounted on the frame and carrying the objective and eye-piece, said member being adapted to turn about an axis perpendicular to the line of collimation of the two last named elements, a second member mounted on the frame for movement about the aforesaid axis, prisms movable with said second member and means for moving the second member independently of the first member to control the field of view of the instrument.

14. In an optical instrument, a casing mounted to turn, a pivoted support, a system of optical parts divided into groups one group being mounted on said casing and another group being retained on said support, said groups of optical parts requiring a relative positioning to render the optical system effective, a receiver mechanism controlling the position of said support, and a transmission systm controlled by a distant operator and operatively connected to said mechanism to set the same in a position selected by the distant operator, said casing being adapted to be turned to position its optical parts in cooperative relation to those mounted on said support.

15. In an optical instrument, a casing and a pivoted holder each mounted to independently turn about axes angularly disposed to each other and common to said casing and holder, a system of optical parts divided into groups one group being mounted on said casing and another group being retained by said holder, said groups of optical parts requiring relative positioning to render the optical system effective, a support for the instrument, differential means associated with said instrument support and operatively connected to said optical parts holder, a receiver mechanism actuatingly connected to said differential means and said optical parts holder, a remotely controlled transmission system governing said receiver mechanism whereby said holder and its optical parts may be set by a distant operator, said casing being adapted to be turned to position its optical parts in co-operative relation to those of said holder, and manually operable means combined with said instrument support and adapted to actuate said differential means and optical parts holder to adjust the latter independently of the remote control thereof.

July 24, 1919.

JAMES BLACKLOCK HENDERSON.